(12) United States Patent
Baker et al.

(10) Patent No.: US 8,605,540 B2
(45) Date of Patent: Dec. 10, 2013

(54) METHOD AND DEVICES FOR UNDERWATER DEPLOYMENT OF A STRUCTURE

(75) Inventors: Paul Baker, Castle Hill (AU); Conrad Wright, Alfords Point (AU)

(73) Assignee: Thales Underwater Systems Pty Limited, New South Wales (AU)

( * ) Notice: Subject to any disclaimer, the term of this patent is extended or adjusted under 35 U.S.C. 154(b) by 443 days.

(21) Appl. No.: 13/062,210

(22) PCT Filed: Aug. 28, 2009

(86) PCT No.: PCT/AU2009/001115
§ 371 (c)(1),
(2), (4) Date: Mar. 3, 2011

(87) PCT Pub. No.: WO2010/025494
PCT Pub. Date: Mar. 11, 2010

(65) Prior Publication Data
US 2011/0149679 A1    Jun. 23, 2011

(30) Foreign Application Priority Data
Sep. 3, 2008 (AU) .............................. 2008904583

(51) Int. Cl.
*G10K 11/00* (2006.01)

(52) U.S. Cl.
CPC .................................. *G10K 11/006* (2013.01)
USPC .................................. 367/4; 367/3; 367/173

(58) Field of Classification Search
USPC ................................................. 367/3, 4, 173
See application file for complete search history.

(56) References Cited

U.S. PATENT DOCUMENTS

| | | | | |
|---|---|---|---|---|
| 3,539,979 A | * | 11/1970 | Crall | 367/20 |
| 3,986,159 A | * | 10/1976 | Horn | 367/4 |
| 4,656,616 A | | 4/1987 | Bennett et al. | |
| 5,091,892 A | * | 2/1992 | Secretan | 367/153 |
| 5,197,036 A | | 3/1993 | Buckingham | |
| 5,602,801 A | * | 2/1997 | Nussbaum et al. | 367/165 |
| 6,018,493 A | | 1/2000 | Buckingham | |
| 6,093,069 A | | 7/2000 | Schelfhout | |
| 6,370,085 B1 | * | 4/2002 | Finkle et al. | 367/173 |
| 6,400,645 B1 | | 6/2002 | Travor | |
| 6,597,631 B2 | | 7/2003 | Kitchin et al. | |
| 6,801,475 B2 | * | 10/2004 | Anderson et al. | 367/173 |
| 2002/0196707 A1 | * | 12/2002 | Kitchin et al. | 367/4 |

OTHER PUBLICATIONS

International Search Report for PCT/AU2009/001115, dated Oct. 9, 2009 (4 pages).

* cited by examiner

*Primary Examiner* — Isam Alsomiri
*Assistant Examiner* — James Hulka
(74) *Attorney, Agent, or Firm* — Perkins Coie LLP

(57) ABSTRACT

Described herein are methods and devices for underwater deployment of a structure. For example, the embodiments described herein are particularly focused on sonobuoys that are configured for autonomous deployment in an underwater environment. One embodiment provides a sonobuoy having a plurality of arms, which are in some embodiments telescopic. The sonobuoy is configured such that, upon deployment in an underwater environment, the arms extend and rotate from a collapsed storage configuration to an operative configuration. The rotation is brought about by way of tension in petal lines, which extend between an innermost telescopic segment of each arm and a central tether line intermediate the arms and a buoyancy device.

20 Claims, 16 Drawing Sheets

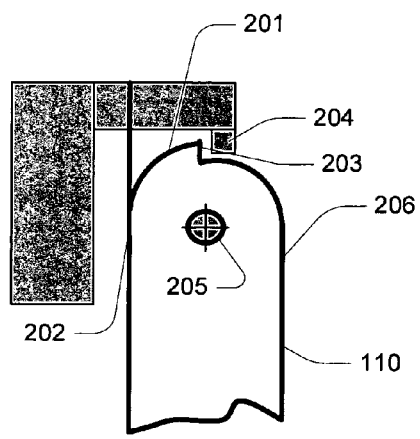
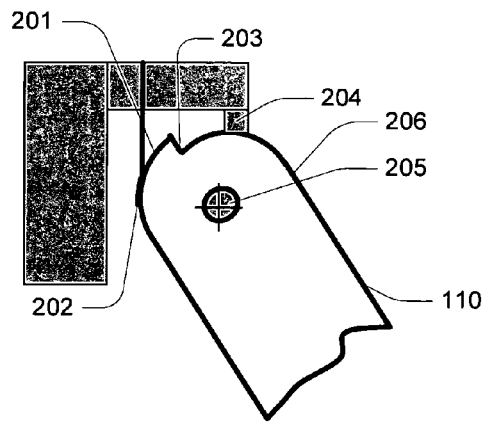
FIG. 2A  FIG. 2B
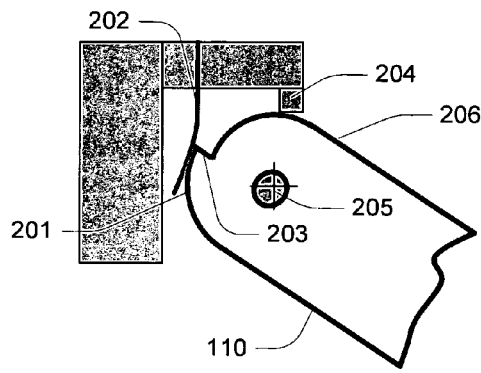
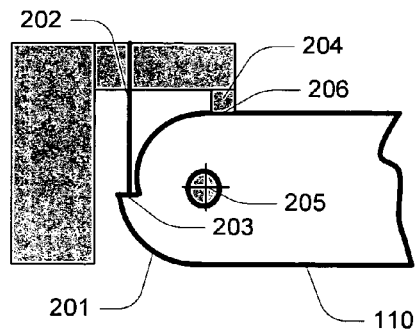
FIG. 2C  FIG. 2D

1

METHOD AND DEVICES FOR UNDERWATER DEPLOYMENT OF A STRUCTURE

CROSS REFERENCE TO RELATED APPLICATION

This application is a national filing of PCT Application No. PCT/AU2009/001115, filed Aug. 28, 2009, which claims priority to Australian Patent Application No. 2008904583, filed Sep. 3, 2008, both of which are incorporated herein in their entireties by reference.

FIELD OF THE INVENTION

The present invention relates to methods and devices for underwater deployment of structure. Embodiments of the invention have been particularly developed for deploying a sonobuoy or the like, with various embodiments taking the form of sonobuoys or components for use in the manufacture of sonobuoys. While some embodiments will be described herein with particular reference to such applications, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

It is known to configure a sonobuoy, or other structure intended for underwater use, to autonomously deploy in an underwater environment. In some situations, such a sonobuoy is initially provided in a stored state and, once disposed in an underwater environment, deployed into an operative state. For example, in the context of some applications a sonobuoy is initially contained within a housing, such as a cylindrical "A" sized canister. In use, the housing is introduced into an underwater environment, and the sonobuoy subsequently deployed from the housing into its operative state.

Various approaches have been implemented for the deployment of sonobuoys. For example, U.S. Pat. No. 6,400,645 discloses as arrangement whereby a sonobuoy has telescopic hinged arm members, which extend and swing upwardly upon deployment from a collapsed configuration to an operative configuration. Wires are connected to the distal ends of the arm members. These wires extend through an annular support unit to which the arms are hinged, and continue to a point of connection with a weighted member. As the weighted member is drawn downwardly under gravitational influence, the wires lever the arms outwardly to thereby deploy the sonobuoy into the deployed state.

The approach proposed by U.S. Pat. No. 6,400,645 is by no means ideal. For example, the present inventors have appreciated various deficiencies, including risk of incorrect deployment, cost of production, complexity, and sacrifices to integrity for the deployed sonobuoy.

There is a need in the art for improved methods and devices for underwater deployment of a structure.

SUMMARY OF THE INVENTION

It is an object of the present invention to overcome or ameliorate at least one of the disadvantages of the prior art, or to provide a useful alternative.

One embodiment provides a device for underwater deployment, the device including:

a tether extending between a buoyant member and a weighted member;
a body positioned on the tether;
a plurality of arms, each arm including:
a primary segment which is hingedly connected to the body; and
one or more further segments which are configured to outwardly extend from the primary segment;
wherein each arm is configured to upwardly and outwardly rotate about its respective hinged connection from a storage configuration to an operative configuration; and
for each arm, a respective petal line that connects the primary segment to a connection point on the tether intermediate the body and the buoyant member;
such that, when introduced to an underwater environment, the buoyant member and weighted member move apart from one another thereby to tension the tether, and wherein the tensioning of the tether increases separation between the connection point and the body, thereby to correspondingly tension the petal lines for effecting upward and outward rotation of the arms from the storage configuration to the operative configuration.

One embodiment provides a method for underwater deployment of a device, the method including:

(a) providing a device as described herein; and
(b) introducing the device to an underwater environment such that the weighted member begins to descend, thereby to tension the tether and effect upward and outward rotation of the arms from the storage configuration to the operative configuration.

One embodiment provides a method of configuring a device for underwater deployment, wherein the device includes a tether extending between a buoyant member and a weighted member, a body positioned on the tether intermediate the buoyant member and the weighted member, and a plurality of arms, each arm including a primary segment which is hingedly connected to the body, and one or more further segments which are configured to extend from the primary segment, wherein each arm is configured to upwardly and outwardly rotate about its respective hinged connection from a storage configuration to an operative configuration, the method including:

for each arm, connecting a respective petal line between the primary segment to a connection point on the tether intermediate the body and the buoyant member, such that, when introduced to an underwater environment, the buoyant member and weighted member move apart from one another thereby to tension the tether, and wherein the tensioning of the tether increases separation between the connection point and the body, thereby to correspondingly tension the petal lines for effecting upward and outward rotation of the arms from the storage configuration to the operative configuration.

One embodiment provides a sonobuoy including:

a tether extending between a buoyant member and a weighted member;
a body positioned on the tether intermediate the buoyant member and the weighted member;
a plurality of arms, each arm including:
a primary segment which is hingedly connected to the body; and
one or more further segments which are configured to extend from the primary segment;
wherein each arm is configured to upwardly and outwardly rotate about its respective hinged connection from a storage configuration to an operative configuration; and for each arm, a respective petal line that connects the primary segment to a connection point on the tether intermediate the body and the buoyant member;

such that, when introduced to an underwater environment, the buoyant member and weighted member move apart from one another thereby to tension the tether, and wherein the tensioning of the tether increases separation between the connection point and the body, thereby to correspondingly tension the petal lines for effecting upward and outward rotation of the arms from the storage configuration to the operative configuration.

One embodiment provides a device for underwater deployment, the device including:

a tether extending between a buoyant member and a weighted member;

a body positioned on the tether intermediate the buoyant member and the weighted member;

a plurality of arms that are hingedly connected to the body, wherein each arm is configured to upwardly and outwardly rotate about its respective hinged connection from a storage configuration to an operative configuration; and for each arm, a respective petal line that fixedly connects the arm to a connection point on the tether intermediate the body and the buoyant member;

such that, when introduced to an underwater environment, the buoyant member and weighted member move apart from one another thereby to tension the tether, and wherein the tensioning of the tether increases separation between the connection point and the body, thereby to correspondingly tension the petal lines for effecting upward and outward rotation of the arms from the storage configuration to the operative configuration.

One embodiment provides a device for underwater deployment, the device including:

a body configured to be positioned on a tether intermediate a buoyant member and a weighted member;

a plurality of arms that are hingedly connected to the body, wherein each arm is configured to upwardly and outwardly rotate about its respective hinged connection from a storage configuration to an operative configuration; and for each arm, a respective petal line that fixedly connects the arm to a connection point on the tether intermediate the body and the buoyant member;

such that, when introduced to an underwater environment, the buoyant member and weighted member move apart from one another thereby to tension the tether, and wherein the tensioning of the tether increases separation between the connection point and the body, thereby to correspondingly tension the petal lines for effecting upward and outward rotation of the arms from the storage configuration to the operative configuration.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

BRIEF DESCRIPTION OF THE DRAWINGS

Preferred embodiments of the invention will now be described, by way of example only, with reference to the accompanying drawings in which:

FIG. 2A to FIG. 2D illustrate an exemplary arm locking arrangement.

DETAILED DESCRIPTION

Described herein are methods and devices for underwater deployment of a structure. For example, the embodiments described herein are particularly focused on sonobuoys that are configured for autonomous deployment in an underwater environment. One embodiment provides a sonobuoy having a plurality of telescopic arms. The sonobuoy is configured such that, upon deployment in an underwater environment, the arms extend and rotate from a collapsed storage configuration to an operative configuration. The rotation is brought about by way of tension in petal lines, which extend between an innermost telescopic segment of each arm and a central tether line intermediate the arms and a buoyancy device.

Although embodiments described herein are focused on telescopically extending arms, in other embodiments the arms are otherwise extendable. For example, each arm includes a primary segment, and one or more further segments that are configured to extend from the primary segment. For example, the further segments may be collapsible parallel to the primary segment (but not coaxial with the primary segment), and/or unravel away from the primary segment.

Figure 1A:
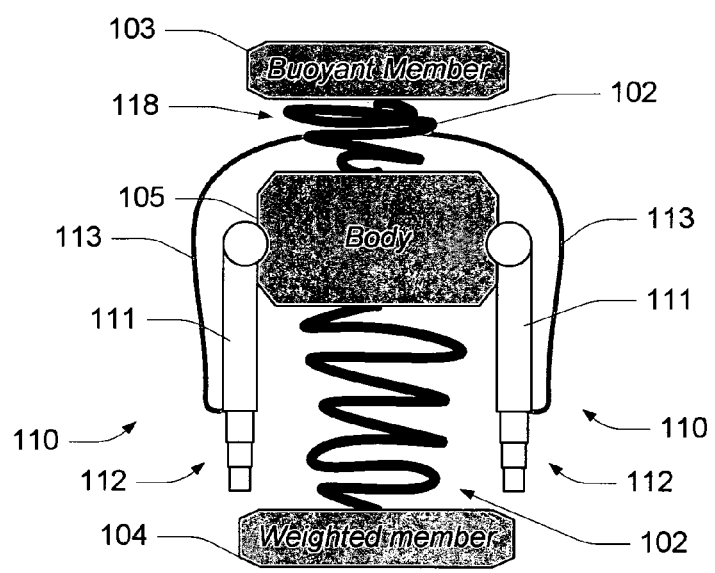
FIG. 1A is a schematic representation of a device for underwater deployment according to one embodiment, shown in a stored state.
Figure 1B:
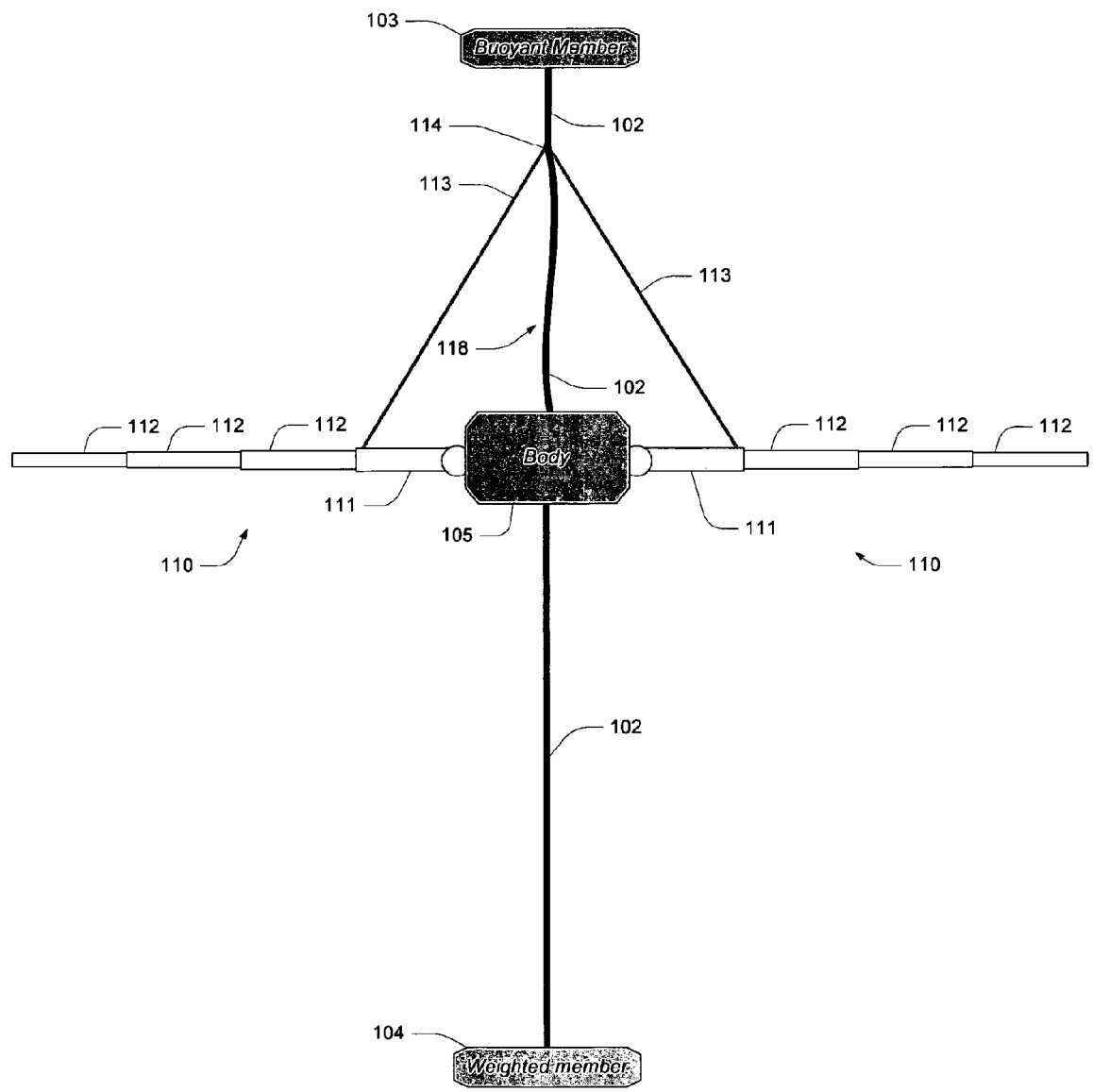
FIG. 1B shows the device of FIG. 1A in a deployed state.

FIG. 1A and FIG. 1B illustrate a device 101 for underwater deployment according to one embodiment. In particular, FIG.

1A illustrates device 101 in a storage state, and FIG. 1B illustrates device 101 in a deployed state. In overview, device 101 is configured to autonomously progress from the storage state to the deployed state following introduction to an underwater environment.

Various references are made to the introduction of a device to an underwater environment. This should not be read in a manner so as to infer that the device is, at any stage, submerged in its entirety. That is, following introduction of a device to an underwater environment herein, a portion of the device may remain at all times at or above the surface. Furthermore, the term "underwater" should not be read to construe a requirement of water in a chemical sense; it will be appreciated that the term should be read broadly so as to cover substantially any liquid material.

Device 101 includes a tether 102 that extends between a buoyant member 103 and a weighted member 104. In the present embodiment tether 102 is continuous, and provides an electrical cable (such as by way of electrical/conductive cable) between buoyant member 103 and weighted member 104. This is particularly relevant for sonobuoy applications, which are discussed further below. However, in some embodiments it is not necessary that tether 102 be continuous.

A body 105 is positioned on tether 102 intermediate buoyant member 103 and weighted member 104. This body supports a plurality of arms 110. In the present embodiment only two arms are shown, primarily for ease of illustration. Each arm includes a primary telescopic segment 111 which is hingedly connected to body 105. One or more further telescopic segments 112 telescopically extend from primary telescopic segment 111. In this manner, the arms are able to extend from the collapsed configuration illustrated in FIG. 1A to the extended configuration illustrated in FIG. 1B. Preferably this occurs automatically following the introduction of device 101 to an underwater environment, and various approaches for achieving this are known (including the use of springs, attachment to weighted members, and so on). For example, a person skilled in the art may be drawn to consider existing sonobuoy technology.

The manner in which automated extension of telescopic arms is achieved is generally ignored for the purpose of the present disclosure, which is more concerned with automated rotation of the arms. To this end, each arm 110 is configured to upwardly and outwardly rotate about its respective hinged connection from a storage configuration to an operative configuration (shown in FIG. 1A and FIG. 1B respectively).

For each arm, a respective petal line 113 connects to the primary telescopic segment 111 to a connection point 114 on tether 102 intermediate body 105 and buoyant member 103. In the present embodiment, for each arm, the respective petal line is connected at or adjacent the distal end of the primary telescopic segment. However, it will be appreciated that other locations on the primary telescopic segment may be used.

Petal lines 103 assist in rotating the arms. In particular, when introduced to an underwater environment, buoyant member 103 and weighted member 104 move apart from one another. As a result, the tether begins to tension, and resulting in an increased separation between connection point 114 and body 105. This correspondingly tensions petal lines 113, thereby effecting upward and outward rotation of arms 110 from the storage configuration to the operative configuration.

The term "tension", as used herein as a verb, describes a relative increase in tension, and should not imply a minimum level of slack. That is, the term "tensioning" generally describes any process by which two points on a rope, cord, or the like (such as the present tether or petal lines) are taken from a first degree of separation to a second degree of separation greater than the first.

Figure 1C:
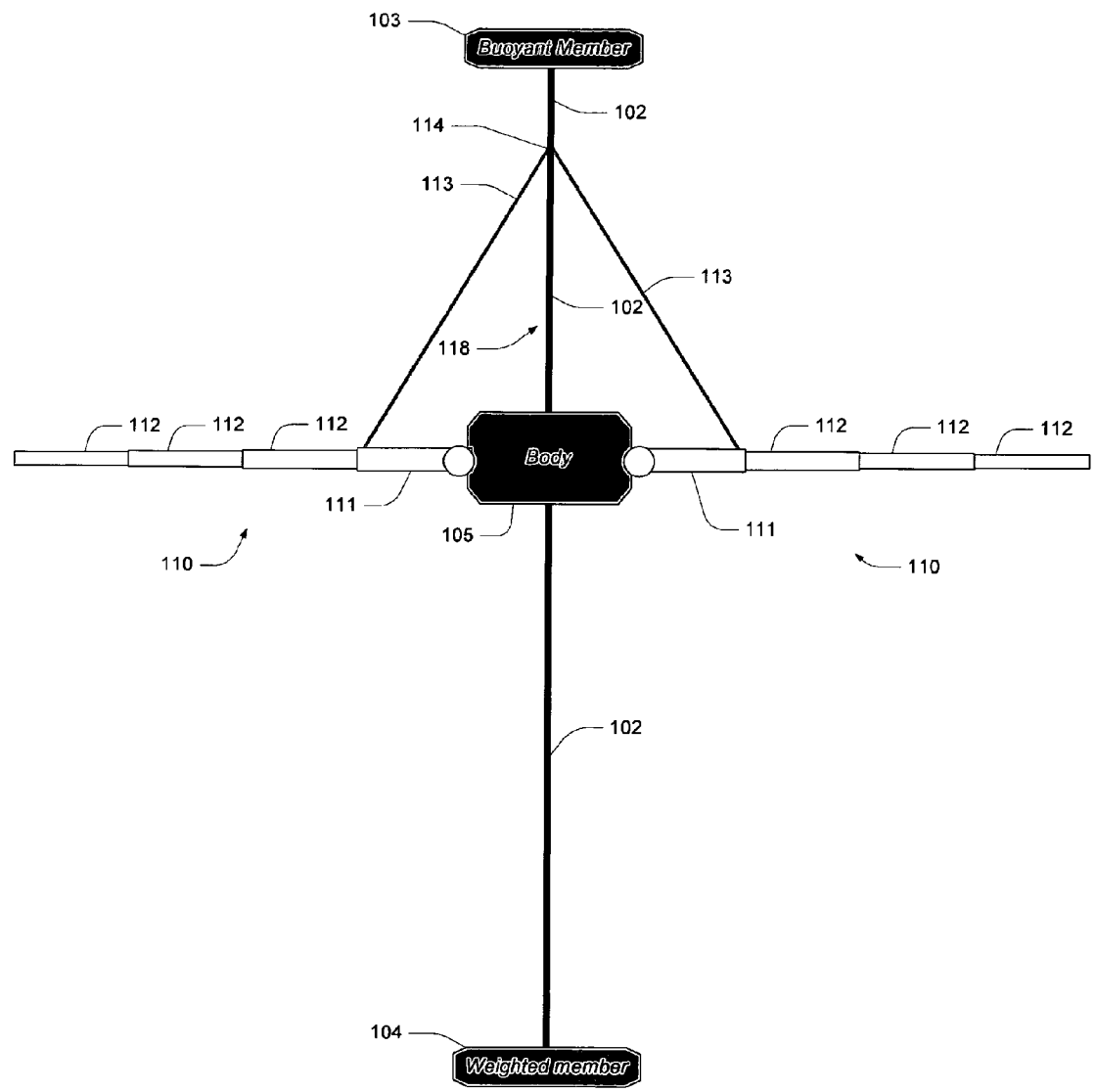
FIG. 1C shows a variation of the device of FIG. 1A in a deployed state.

In the present example, tether 102 and petal lines 113 are configured such that a region 118 of tether 102 intermediate connection point 114 and body 105 remains slack. In this manner, the downward force of body 105 and weighted member 104 passes through primary segments 111 and petal lines 113. This is particularly advantageous in load balancing, and increases stability of device 101. However, in some embodiments, such as that of FIG. 1C, region 118 is fully tensioned when device 101 is in the deployed state.

In the present embodiment, arms 110 and body 105 are configured such that, upon upward and outward rotation of the arms to a predefined configuration, presently defined by the operative configuration of FIG. 1A, the arms lock with respect to the body thereby to prevent further rotation. Although in the present example the arms are generally horizontal when in the operative configuration, that is by no means necessary. For example, in some embodiments the operative configuration places the arms at an angle (which need not be constant between the arms, particularly if arm weights vary) inclined above or below the horizontal. This is determined by the configuration of the arms and body for the purposes of this locking. By way of example, in some cases each arm includes a cam portion that is profiled for cam-locking engagement with the body upon the arm reaching the predefined configuration. In some cases body includes, for each arm, a locking member for preventing the further rotation.

An exemplary arm locking arrangement is illustrated by way of FIG. 2A through FIG. 2D. In this example, each arm 110 includes a cam surface 201 which engages with a resilient member, presently taking the form of a flat steel spring 202, which is mounted to body 105. When the arm is in the storage configuration (FIG. 2A) it is generally retained in position between spring 202 and a mechanical stop 203, which abuts against a locking notch 204.

Surface 201 has a gradually increasing diameter cam profile to displace spring 202 outwards as the arm rotates about hinge 205, as shown in FIG. 2B and FIG. 2C. This occurs under influence of the tensioning of petal lines 113, as discussed above. Eventually, the arm rotates to the position shown in FIG. 2D, at which point spring 202 passes surface 202 and becomes locked against locking notch 204, thereby substantially preventing rotation in the reverse direction. Concurrently, region 206 of arm 110 moves into abutting engagement with mechanical stop 203, thereby substantially preventing further upward and outward rotation. As such, arm 110 becomes locked in the operative configuration.

It will be appreciated that varying the positioning of spring 202 and stop 203 on body 205 allows for the defining of a desired operational configuration for the arms.

Figure 3A:
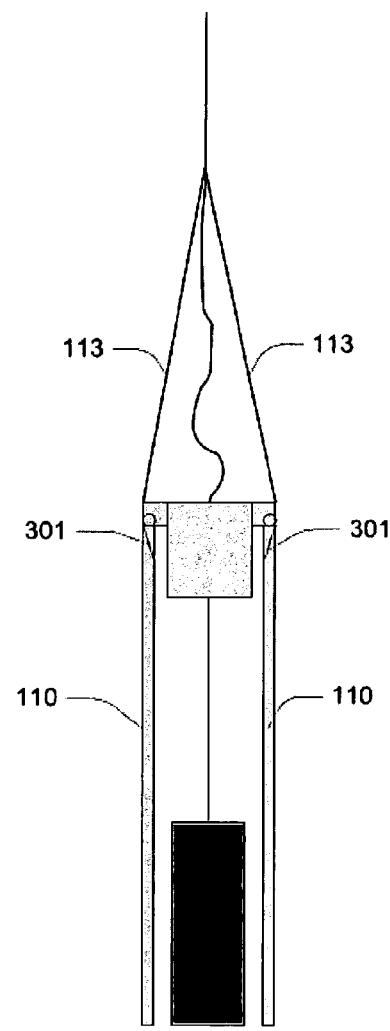
FIG. 3A to FIG. 3C illustrate an embodiment where springs are used to encourage initial rotation of arms.
Figure 3B:
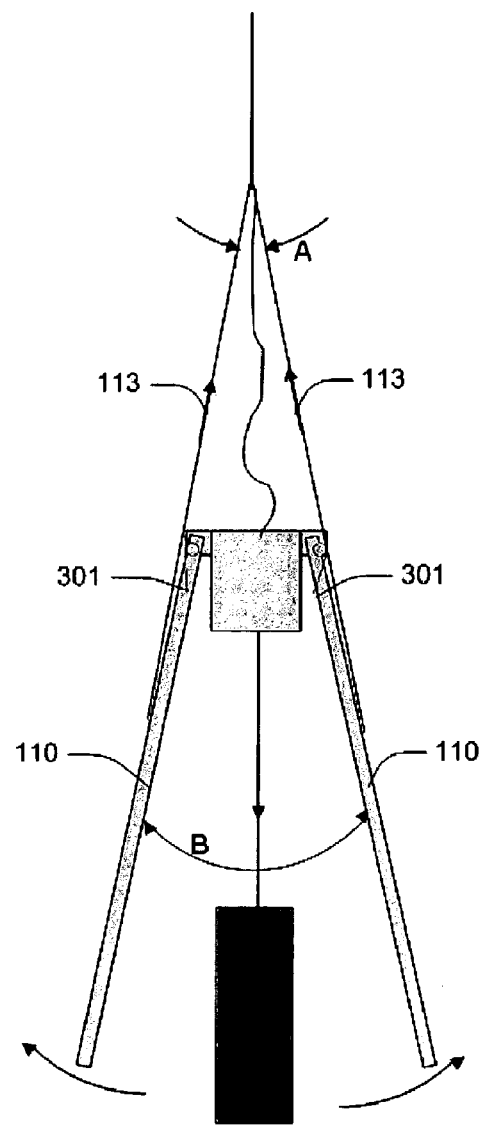

In some embodiments, additional force is applied to arms 105 thereby to initiate rotation from the storage configuration to the operative configuration. This reduces the likelihood of incorrect deployment, for example where the force applied via the petal lines unbalances the device by pulling the primary segment in a direction other than that which is intended. A particular example along these lines is provided via FIG. 3A through to FIG. 3B. Similar numerals are used here as with previous examples for the sake of simplicity. In this example, petal lines 113 are assisted by torsion springs 301 to open arms 110 to the point where the arms have rotated to an angle B which is greater than angle A, as best shown in FIG. 3B. It will be appreciated that angle A is determined by the height above the body of attachment point 114. In some embodiments angle B is about 15 degrees. Following this threshold rotation, the springs no longer contact with the arms. The torsion springs are optionally wound on hinges 205, and abut with an external surface of their respective arms.

In practical terms, a compressive force may be applied to torsion springs 301 thereby to maintain the device in the storage state. For example, in some embodiments the device is initially contained within a storage canister, and sidewalls of that canister provide such a compressive force. Following introduction to the underwater environment, the device escapes from the canister, the compressive force is released, and the torsion springs extend to effect the initial rotation of the arms. In another embodiment a retaining band formed of spring steel is resiliently maintained about the arms, held in place by way of a pin, thereby to provide the compressive force. This pin is automatically removed during deployment, thereby to release the retaining band. For example, in one embodiment the pin is coupled to a weighted component, such as a storage canister, or a baseplate at the bottom of such a storage canister, or a lower component such as a lower transmitter transducer.

Figure 4:
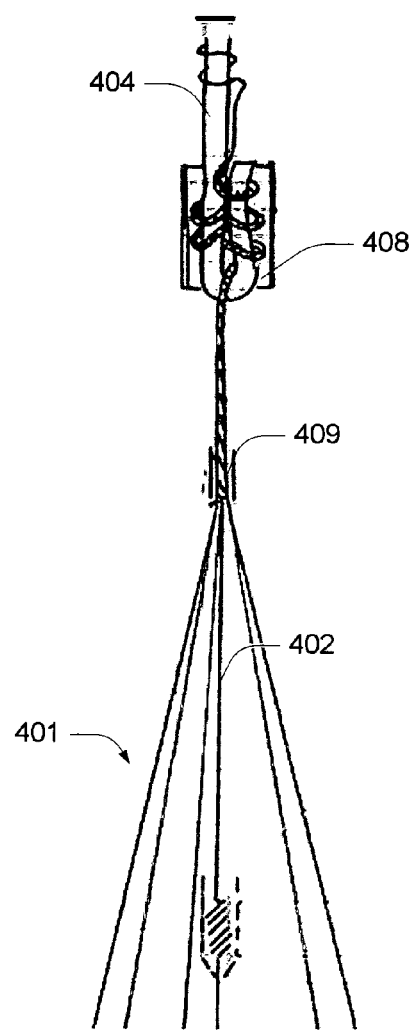
FIG. 4 illustrates an embodiment making use of Vectran fibre.

FIG. 4 illustrates an exemplary approach for connecting petal lines to the main tether. In this embodiment, five petal lines 401 are connected to a main tether 402. Tether 402 includes an electrical cable 402, which connects a buoyancy member (not shown) to lower components, including a receive electronics unit 403 to which the arms (not shown) connect. At an upper region of tether 402, cable 402 is slack with respect to a bungee 404, this bungee being resilient thereby to isolate lower components from the up and down cycling movement of the surface unit in waves. As such, those lower components (which, in the case of a sonobuoy, may include acoustic transmitting and receiving components) can remain substantially locked into the local body of water.

In the present example, a manufactured fibre, spun from a liquid crystal polymer, is used to provide the petal lines 401. For the sake of the present examples, Vectran is considered. Vectran is a product name used to describe a manufactured fibre, spun from a liquid crystal polymer created by Celanese Acetate LLC and now manufactured by Kuraray Co., Ltd. No permission or affiliation should be inferred from the present use of this term. It will be appreciated that other fibres are used in other embodiments.

The Vectran fibre is fed onto a region of cable 402 and fixedly attached. In the present embodiment, the Vectran fibre is fed onto the cable for a length of about 150 mm to 300 mm (preferably about 220 mm), including two to six (preferably four) loops around a bungee loop 408 (which is subsequently heatshrunk) and a length below the bungee loop. An alternate approach is to make use of a Chinese finger.

A piece of heatshrink is fed over the electrical cable and Vectran at the end of the insertion point of the Vectran (region 409), and shrunk down. The braiding of the Vectran is separated so there are eight Vectran members, and three of those are removed, evenly spaced around the braiding. The five remaining Vectran strands are connected to each of the five arms.

Figure 5:
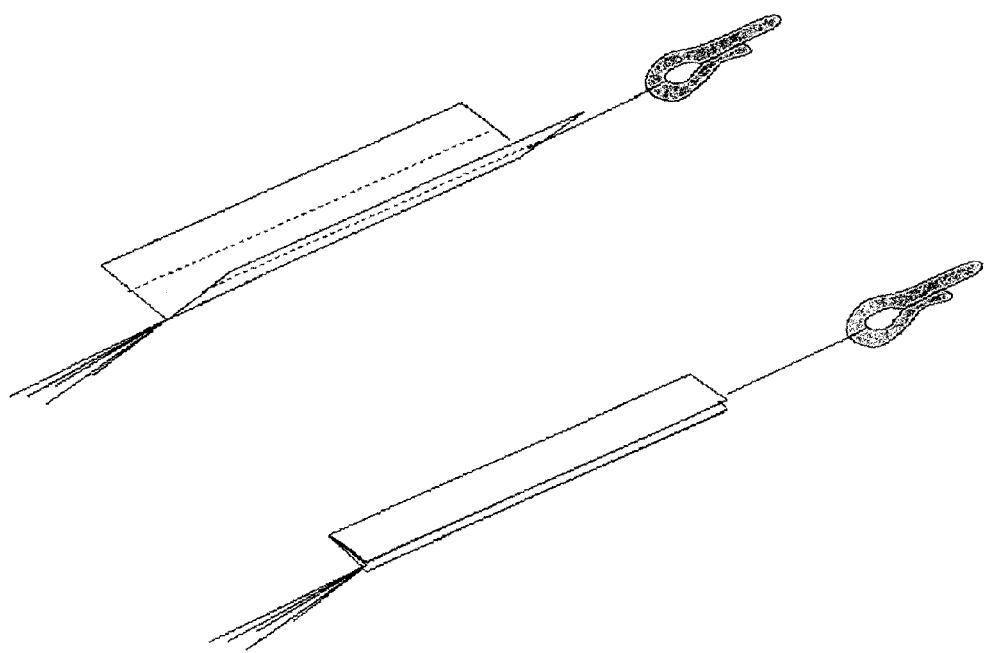
FIG. 5 illustrates an exemplary folding approach for storing individual Vectran strands prior to deployment for reducing the likelihood of those strands becoming tangled.

In this embodiment, a further heatshrink region is used to reduce the likelihood of snagging between the petal lines and the cable. As a further measure to reduce the likelihood of snagging, particularly when the device is in the stored state, the petal lines and cable are maintained in a folded paper envelope as shown in FIG. 5.

Figure 6:
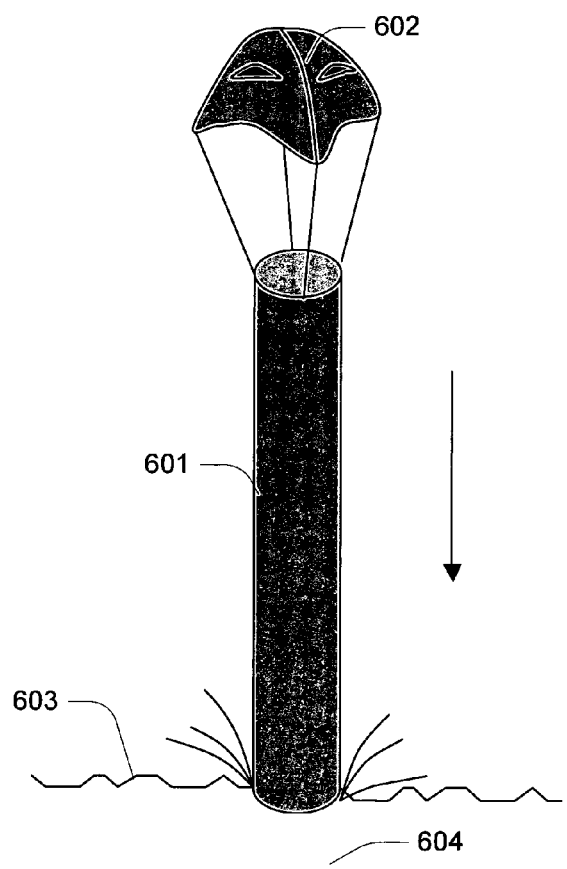
FIG. 6 illustrates a sonobuoy according to one embodiment, shown in conjunction with deployment articles.

As foreshadowed, the present technology is in some cases applied to sonobuoys. A particular example along these lines is illustrated in FIG. 6, and FIG. 7A through FIG. 7E. FIG. 6 illustrates a sonobuoy according to one embodiment, shown in conjunction with deployment articles. In this example, a sonobuoy is contained within a canister 601, which is dropped from a plane or the like (not shown), and descends under the influence of gravity, and under the control of a parachute 602, until it contacts with the surface 603 of a body of water 604. Deployment commences following water impact.

FIG. 7A through FIG. 7F illustrate the deployment of a sonobuoy 701 according to one embodiment. This sonobuoy is optionally initially contained in a canister and dropped from a plane or the like, along the lines of the example of FIG. 6. Sonobuoy 701 generally includes features of device 101, including a tether, and telescopic arms having primary segments connected to a connection point on that tether.

Figure 7A:
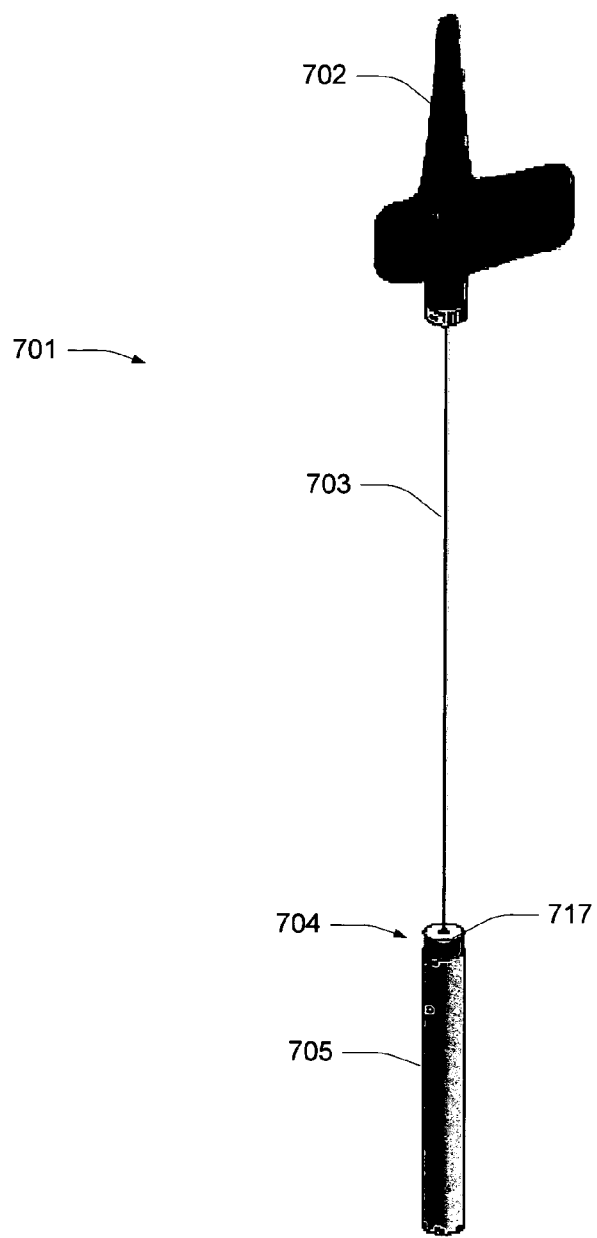
FIG. 7A to FIG. 7F illustrate the deployment of a sonobuoy according to one embodiment.

FIG. 7A illustrates sonobuoy 701 shortly after introduction to an underwater environment. The sonobuoy includes a buoyant member 702. Buoyant member 702 is configured to float at or close to the surface, and includes communications equipment (such as an RF transmitter or the like) for wireless communication of data. A tether 703, which includes conductive cable, extends from buoyant member 702 to a submersible assembly 704. Assembly 704 is initially maintained within a canister 705.

Initially, a buoyant member 702 is contained within the top of canister 705. To this end, in the present example, buoyant member 702 includes a large float, in the form of a polyurethane bag, which is inflated by $CO_2$ gas from two small $CO_2$ gas canisters, by way of a soda syphon or the like.

Figure 7B:
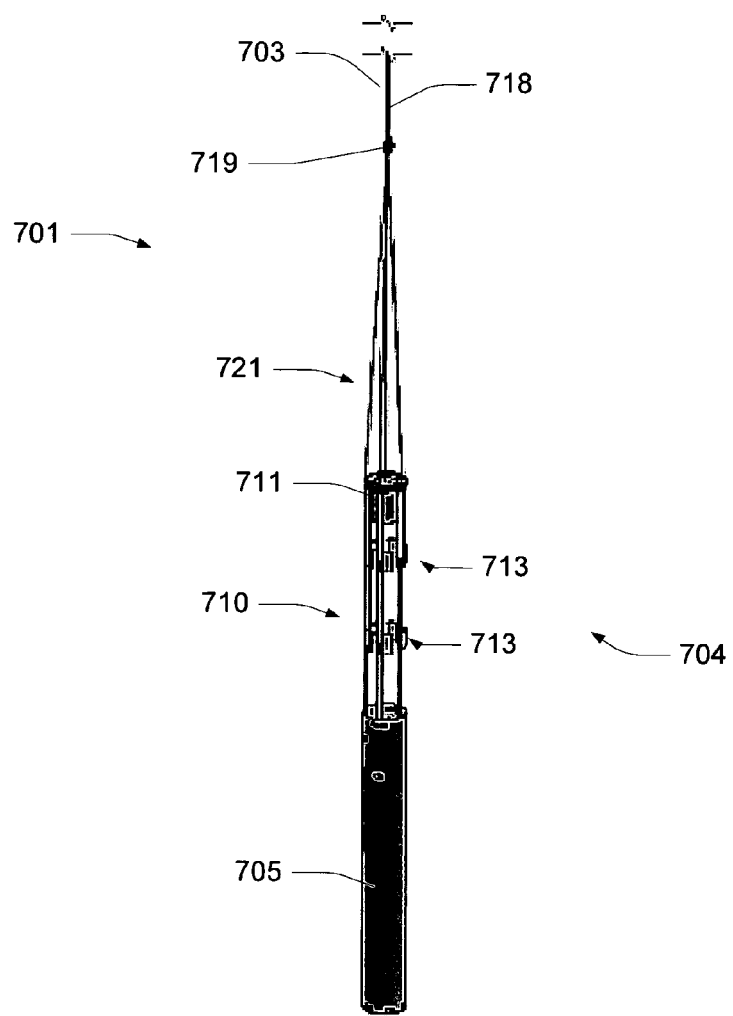

Device 701 is deployed from a boat, aeroplane or other locations whilst generally in a configuration as illustrated in FIG. 6. Upon introduction to an underwater environment, the buoyant member 702 inflates and remains on the surface whilst canister 705 (containing assembly 704) begins to sink, with the cable paying out, as shown in FIG. 7B. At this point, telescopic arms 710 begin to extend, and assembly 704 begins to escape from canister 705. This reveals a body 711, which includes a receive electronics housing 712. This receive electronics housing received (and optionally processes) data collected at hydrophones 713 positioned on arms 710.

Figure 3C:
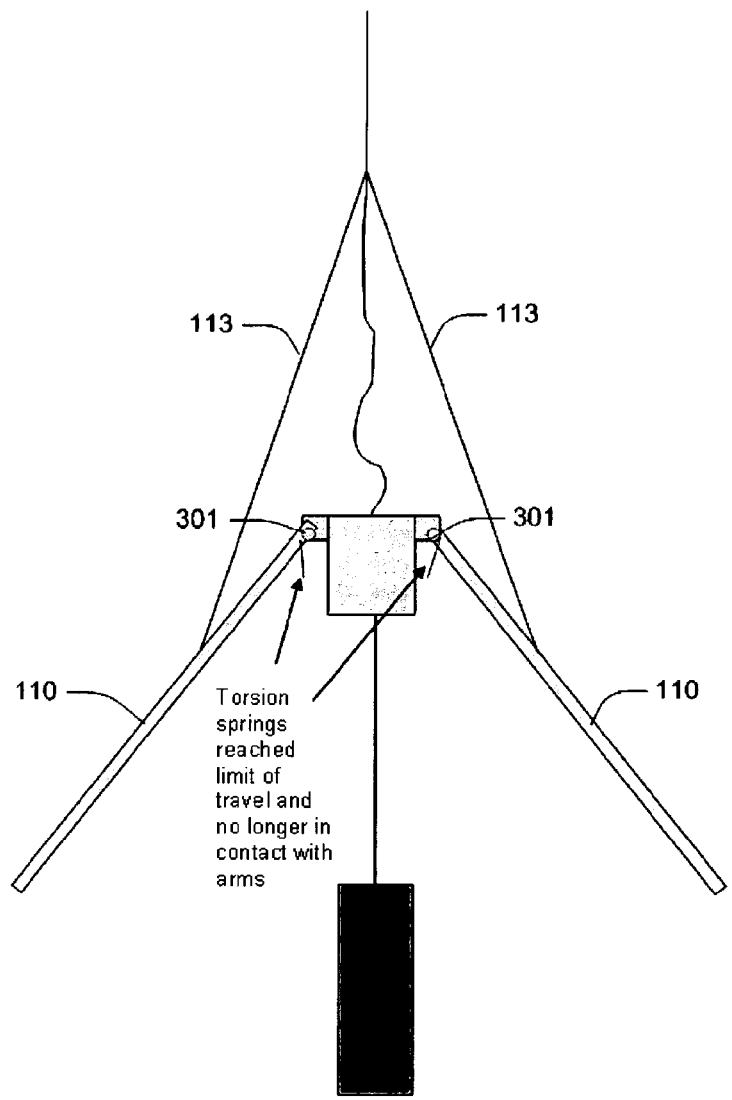
Figure 7C:
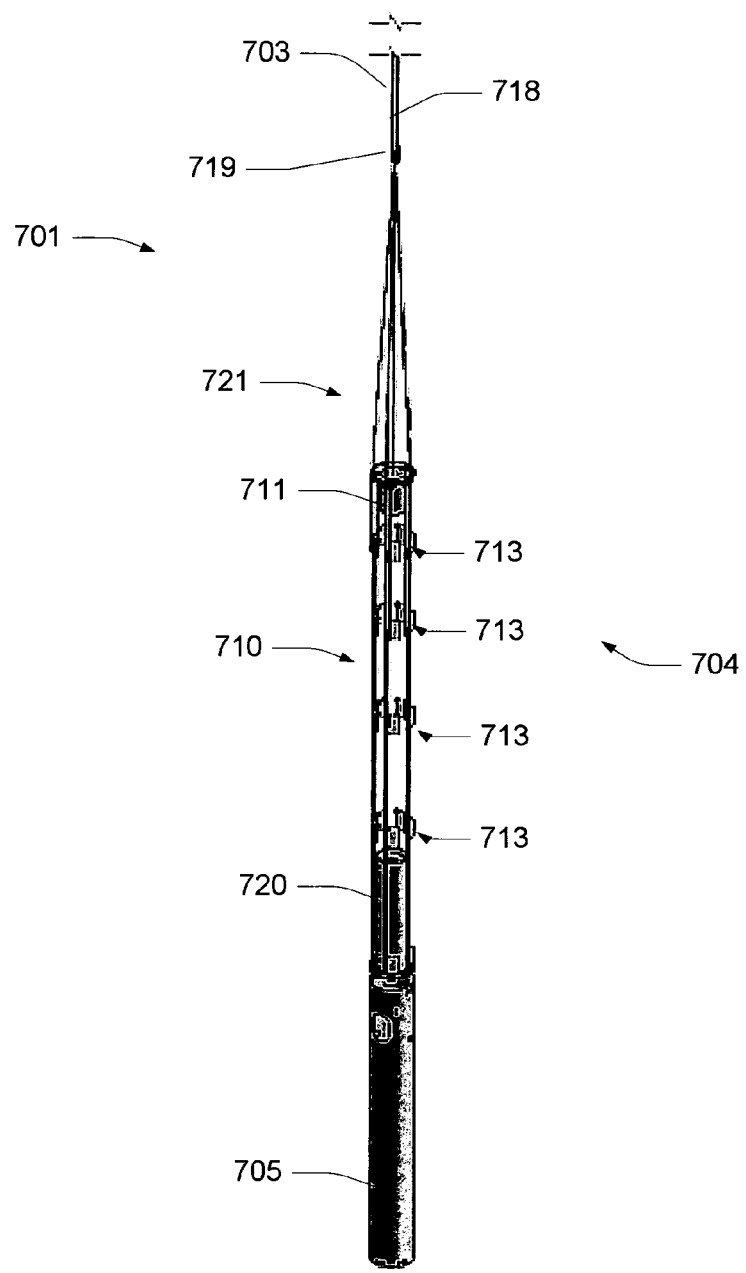
Figure 7D:
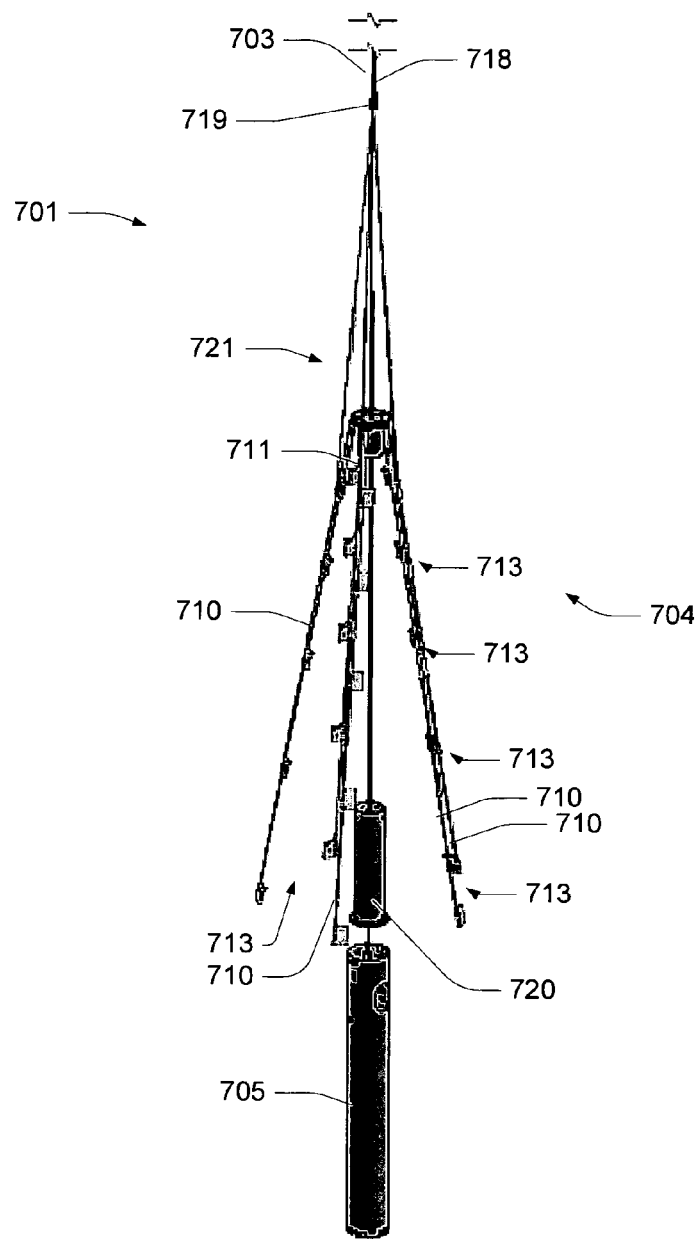
Figure 7E:
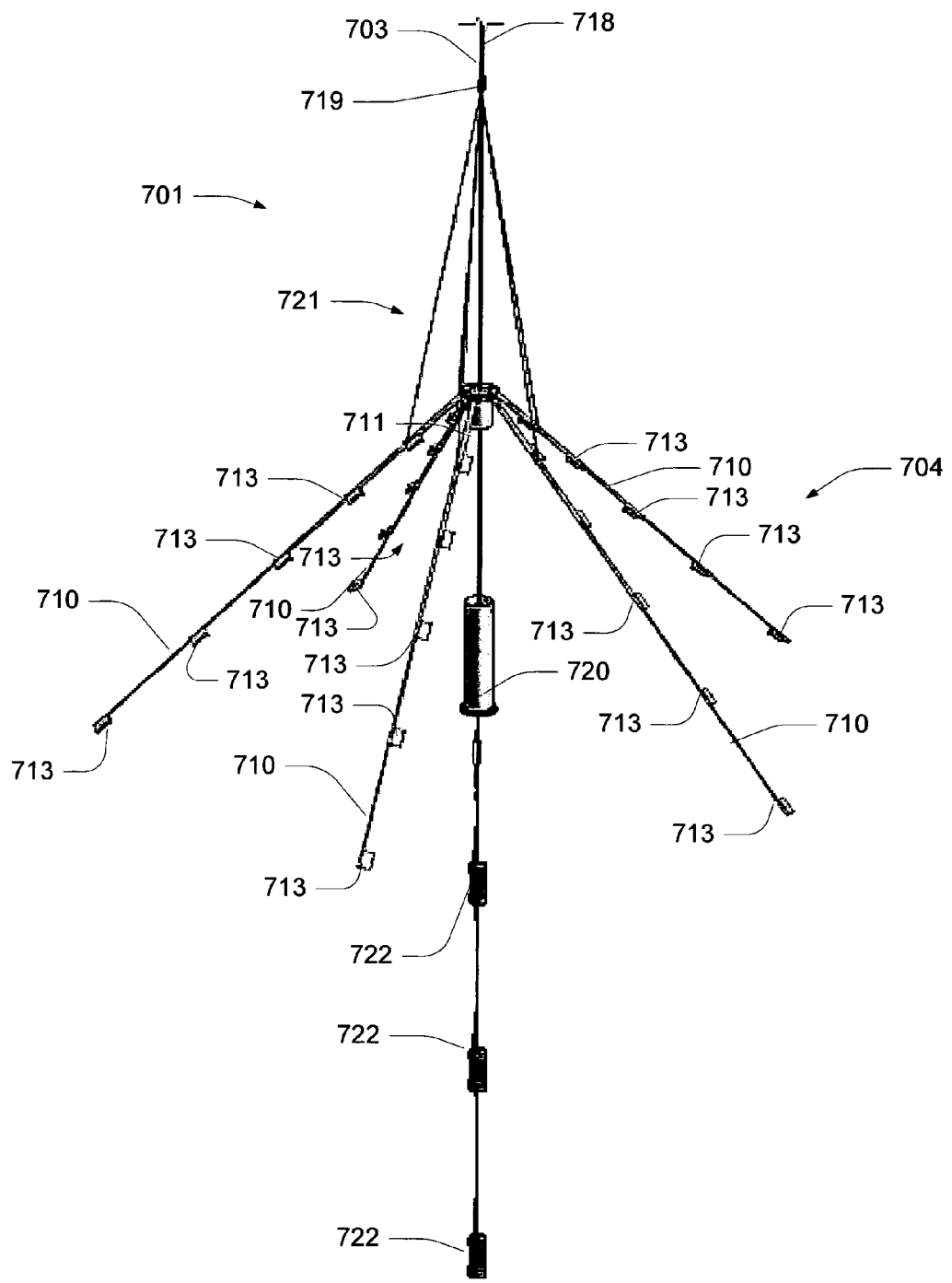
Figure 7F:
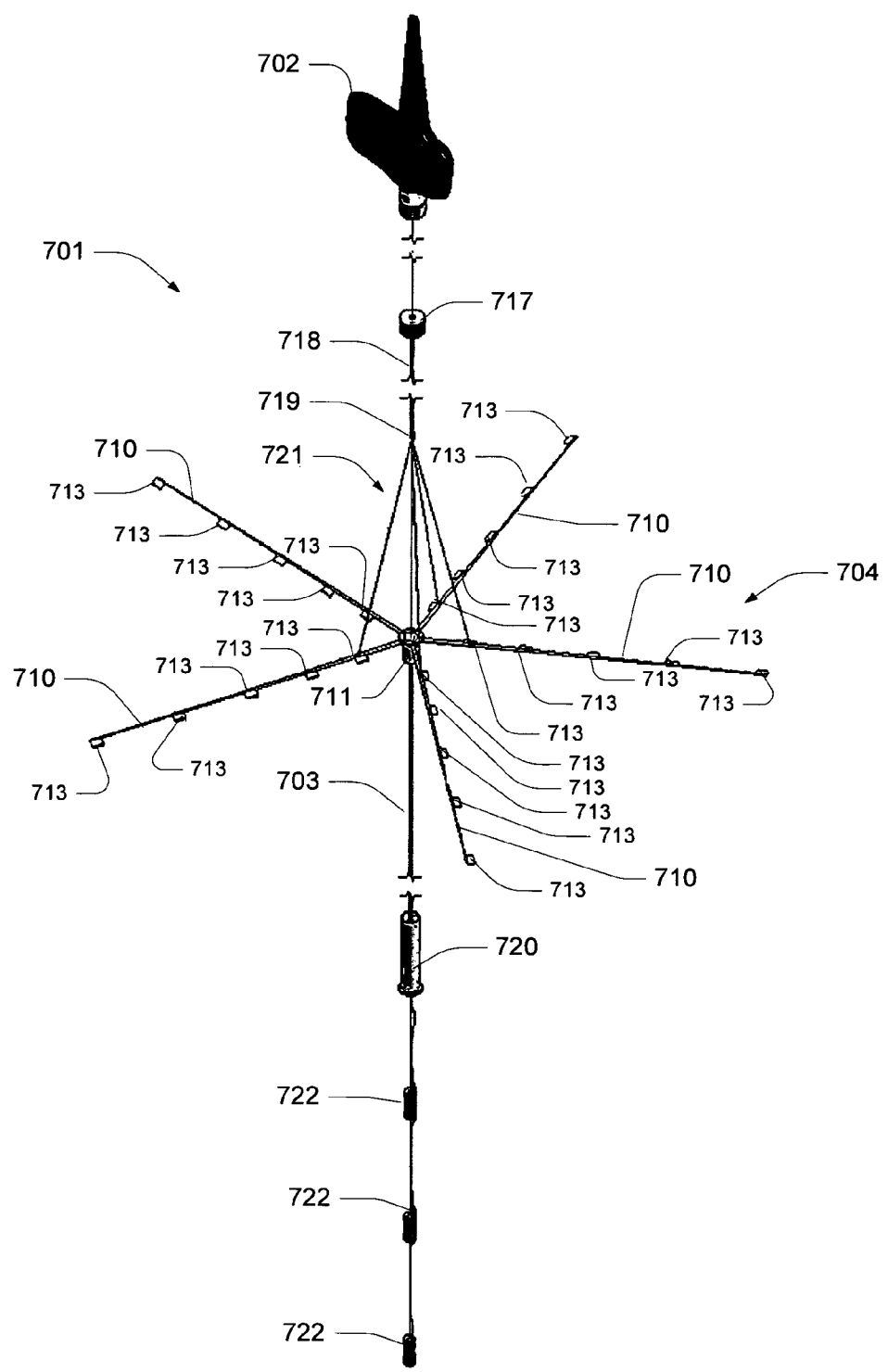

As assembly 704 continues to escape from canister 705, as shown in FIG. 7C, a transmit electronics housing 720 is revealed. In some cases the arms hook under this housing to assist in their extension. Continuing to FIG. 7D, the arms and transmit electronic housing eventually fully escape from the canister, at which point the arms begin to rotate upwardly and outwardly, initially under the influence of a resilient bias provided by torsion springs, (as in the example of FIG. 3A to FIG. 3C above), and generally under influence of petal lines 721, which are presently formed of Vectran fibre as discussed further above (for example in relation to FIG. 4). Finally, by reference to FIG. 7E, assembly 704 fully escapes from canister 705, revealing a plurality of transmitter transducers 722 which provide signals under the control of the transmit electronics housing. Transmitter transducers 722, housing 720 and housing 712 are all fixedly attached on tether 703 and in electrical communication with one another via conductive cable (or, in some embodiments, other communications lines).

Arms 712 continue to rotate until they reach their operative configuration, defined by a locking arrangement such as illustrated in FIG. 2A to FIG. 2D. This may be the configuration shown in FIG. 7F, or a position where the arms are other than horizontal. Region 725 of tether 703 remains slightly slack when the arms reach the operative configuration. With the arms fully extended and rotated, and transmitter transducers 722 at the extent of their allowed descent, sonobuoy 701 is fully deployed.

Similarly to the example of FIG. 4, a bungee portion 718 is provided on tether 103. This bungee portion is provided at a region intermediate a cable pack 717 and the point of connection 719 between the Vectran petal lines 721 and the tether (although typically not throughout this entire region).

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The claims defining the invention are as follows:

1. A device for underwater deployment, the device including:
   a tether extending between a buoyant member and a weighted member;
   a body positioned on the tether;
   a plurality of arms, each arm including:
      a primary segment which is hingedly connected to the body; and
      one or more further segments which are configured to outwardly extend from the primary segment;
   wherein each arm is configured to upwardly and outwardly rotate about its respective hinged connection from a storage configuration to an operative configuration; and
   for each arm, a respective petal line that connects the primary segment to a connection point on the tether intermediate the body and the buoyant member;
   such that, when introduced to an underwater environment, the buoyant member and weighted member move apart from one another thereby to tension the tether, and wherein the tensioning of the tether increases separation between the connection point and the body, thereby to correspondingly tension the petal lines for effecting upward and outward rotation of the arms from the storage configuration to the operative configuration.

2. A device according to claim 1 wherein the primary segment is a primary telescopic segment, and wherein the one or more further segments are configured to outwardly telescopically extend from the primary segment.

3. A device according to claim 1 wherein the body is positioned intermediate the buoyant member and the weighted member.

4. A device according to claim 1 wherein the body is integrally formed with the weighted member.

5. A device according to claim 1 wherein, for at least one arm, the respective petal line is connected at or adjacent the distal end of the primary segment.

6. A device according to claim 1 wherein the arms and body are configured such that, upon upward and outward rotation of the arms to a predefined configuration, the arms lock with respect to the body thereby to prevent further rotation.

7. A device according to claim 6 wherein each arm includes a cam portion that is profiled for cam-locking engagement with the body upon the arm reaching the predefined configuration.

8. A device according to claim 6 wherein the body includes, for each arm, a locking member for preventing the further rotation.

9. A device according to claim 1 wherein the tether includes an electrical cable.

10. A device according to claim 1 wherein, upon rotation of the arms to the operative configuration, a downward force applied to the body is transferred to the connection point via the petal lines and the primary segments rather than the tether.

11. A device according to claim 1 wherein, upon rotation of the arms to the operative configuration, the tether is slack intermediate the connection point and the body.

12. A device according to claim 1 wherein at least two of the petal lines are provided by respective strands of a common fibre.

13. A device according to claim 12 wherein all of the petal lines are provided by respective strands of a common fibre.

14. A device according to claim 12 wherein the fibre is Vectran.

15. A device according to claim 14 wherein the region of the fibre is fixedly attached to the corresponding region of the tether by way of a heatshrinking process.

16. A device according to claim 12 wherein the common fibre is fed onto a portion of the tether, and a region of the fibre fixedly attached to a corresponding region of the tether.

17. A device according to claim 1 wherein a resilient bias is provided for causing upward and outward rotation of the arms through at least a predetermined angle, thereby to initially assist rotation under influence of the petal lines.

18. A device according to claim 1 wherein the device is a sonobuoy.

19. A device for underwater deployment, the device including:
- a tether extending between a buoyant member and a weighted member;
- a body positioned on the tether intermediate the buoyant member and the weighted member;
- a plurality of arms that are hingedly connected to the body, wherein each arm is configured to upwardly and outwardly rotate about its respective hinged connection from a storage configuration to an operative configuration; and
- for each arm, a respective petal line that fixedly connects the arm to a connection point on the tether intermediate the body and the buoyant member;
- such that, when introduced to an underwater environment, the buoyant member and weighted member move apart from one another thereby to tension the tether, and wherein the tensioning of the tether increases separation between the connection point and the body, thereby to correspondingly tension the petal lines for effecting upward and outward rotation of the arms from the storage configuration to the operative configuration.

20. A device for underwater deployment, the device including:
- a body configured to be positioned on a tether intermediate a buoyant member and a weighted member;
- a plurality of arms that are hingedly connected to the body, wherein each arm is configured to upwardly and outwardly rotate about its respective hinged connection from a storage configuration to an operative configuration; and
- for each arm, a respective petal line that fixedly connects the arm to a connection point on the tether intermediate the body and the buoyant member;
- such that, when introduced to an underwater environment, the buoyant member and weighted member move apart from one another thereby to tension the tether, and wherein the tensioning of the tether increases separation between the connection point and the body, thereby to correspondingly tension the petal lines for effecting upward and outward rotation of the arms from the storage configuration to the operative configuration.

* * * * *